United States Patent [19]

Otte et al.

[11] 4,115,265
[45] Sep. 19, 1978

[54] METHOD AND APPARATUS FOR DEHYDRATING SUSPENSION

[75] Inventors: Wilhelm Otte, Bochum; Günther Bergmann, Dinslaken; Kar-Heinz Kubitza, Essen-Heisingen, all of Germany

[73] Assignee: Klockner-Humboldt-Deutz Aktiengesellschaft, Germany

[21] Appl. No.: 751,206

[22] Filed: Dec. 16, 1976

[30] Foreign Application Priority Data

Dec. 24, 1975 [DE] Fed. Rep. of Germany ....... 2558794

[51] Int. Cl.² ............................................. B01D 33/10
[52] U.S. Cl. ........................................ 210/68; 34/122; 34/124; 165/91; 210/71; 210/77; 210/180; 210/186; 210/217; 210/244; 210/402
[58] Field of Search ................. 210/71, 175, 180, 181, 210/184, 185, 186, 209, 210, 212, 216, 217, 244, 359, 402, 403, 416 R, 68, 96 R, 177; 165/89–91; 34/108, 110, 114, 115, 119, 122, 124, 125; 162/207, 290

[56] References Cited

U.S. PATENT DOCUMENTS

| 2,166,379 | 7/1939 | Skagerberg | 34/122 |
| 2,198,412 | 4/1940 | McDonald | 210/68 |
| 2,301,803 | 11/1942 | Davis | 210/68 |
| 2,406,820 | 9/1946 | Fisher et al. | 34/122 |
| 3,338,411 | 8/1967 | Von der Gathen et al. | 210/68 |
| 3,361,259 | 1/1968 | Von der Gathen et al. | 210/68 |
| 3,592,341 | 7/1971 | Emmett et al. | 210/68 |
| 3,744,543 | 7/1973 | Emmett et al. | 210/68 |

*Primary Examiner*—Frank Sever
*Attorney, Agent, or Firm*—Hill, Gross, Simpson, Van Santen, Steadman, Chiara & Simpson

[57] ABSTRACT

Method and apparatus for dehydrating suspensions by means of a vacuum filter and consisting of applying the suspension to the surface of the vacuum filter, directing steam along the path parallel to the surface and thereafter passing the steam into contact with the filter cake on the surface.

14 Claims, 2 Drawing Figures

METHOD AND APPARATUS FOR DEHYDRATING SUSPENSION

BACKGROUND OF THE INVENTION

1. Field of the Invention

This invention is in the field of vacuum filters including a rotatable drum which has a foraminous filter surface thereon. There are provided an arcuate jacket in spaced parallel relation to a portion of the periphery of the drum, and divider means to divide the jacket into two superposed chambers. One of the chambers is connected to a source of steam and the other is in open communication with the filter surface.

2. Description of the Prior Art

Slurries which occur in the preparation of coal in large quantities could previously be utilized with efficient economic results only when it was possible to mix the coal slurries after being reduced to approximately a 20 to 25% water content with coking coal. There was a limit, however, on this kind of an operation because the water content of the coal could not be increased as much as desired. In other cases, the dehydrated coal slurry had to be applied as a fuel of lesser quality with appreciable losses.

In order to bring down the water content of the slurries as much as possible, it has been suggested to employ suction filters for the production of a filter cake which was removed and subjected to infrared radiation, whereupon the filter layer was raised to the apex of the filter drum, turned and further dried. Such a method is described in German Pat. No. 1,015,412. With this method, however, the water content of the filter cake was diminished only slightly, and the investment expenditure for this equipment was quite high.

In German Laid Out Specification No. 1,177,572 there is described a method for the dehydration of coal slurries with vacuum drum or vacuum disc filters, wherein water vapor at a raised temperature and with a predetermined pressure is conveyed to a previously dehydrated filter cake. The water vapor pressure was so adjusted that the condensation point of the steam penetrating into the previously dehydrated filter cake existed directly above the filter. The utilization of this method in practice, however, established that the superheated steam temporarily or intermittently condensed on the surface of the filter cake or on the inner walls of the filter drum assembly, and the condensate deposited itself particularly in the areas of the removal apparatus, so that the water content of the cake was again increased to an undesirable extent.

SUMMARY OF THE INVENTION

The present invention represents an improvement in the method of decreasing the water content of aqueous suspensions, particularly coal slurries with the aid of hot steam. The filter of the present invention makes possible a dehydration of a slurry type suspension or sludge to very low water contents.

In accordance with the present invention, a stream of steam is guided within a jacket provided about the periphery of a vacuum filter drum so that the superheated steam introduced into the jacket gives off heat to the steam contacting the filter cake. With this improvement, the filter cake is acted upon with steam of almost uniformly high temperature over its entire effective area, so that there is no condensation which reaches the surface of the filter cake to impair its drying. The steam serving as a heat carrier may condense in the effective area in defined layers close to the surface of the filter. In this way, the latent heat of vaporization may be liberated to heat the filter cake optimally, so that the viscosity and the surface tension of water in the filter cake decrease and the physical conditions for the withdrawal of water are appreciably improved, whereby the condensation water and the residual water content may be drawn controllably out of the filter cake. In this way, very low moisture contents are attained in the filter cake so that the coal slurry or the like may without further processing be admixed with a coal even with higher moisture contents. Consequently, the economic utilization of these slurries is improved. Also, through the low residual moisture content, further treatment of the cake, for example, by handling in conveyors or the like, dosaging or mixing, in the case of grinding and the like is facilitated.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
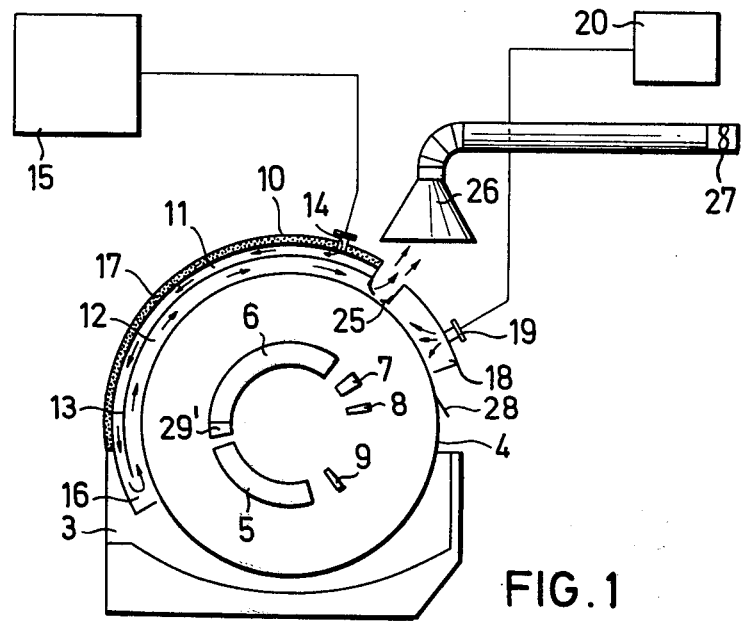
FIG. 1 is a diagrammatic showing of a vacuum drum filter, partially in cross-section.

In accordance with the present invention, we provide a drum filter with a suction zone and a dehydration zone, in accordance with common practice. In our filter, however, there is a lower vacuum provided in the suction zone than in the dehydration zone. With this arrangement, the cake thickness is decreased and the solids are more loosely deposited on the filter, as the velocity of flow is decreased. In combination with the higher vacuum in the dehydration zone, a more rapid carrying off of the capillary water occurs. Consequently, the point at which the steam is drawn through the cake occurs at the beginning of the dehydration zone so that both the condensation water resulting in the filter cake as well as a large part of the water remaining in the finer capillaries in the cake are drawn off before the cake is discharged.

In a further embodiment of the invention, the degree of dehydration of the filter cake is determined beyond the area in which the steam is effective on the filter cake. In response to this degree of dehydration, the level of the vacuum in the suction zone and/or the quantity of steam are controlled. With this arrangement, there is no superfluous steam escaping into the surroundings from the jacket, and in addition, depending on the consistency of the filter cake, optimum physical conditions can be provided for the heat treatment of the filter cake. This results in providing an optimum permeability for the cake, resulting in a rapid evacuation of the coarse capillaries, so that the steam is taken up at the beginning of the dehydration zone. Also, there results a condensation front in the filter cake as close as possible to the interface between the filter cake and the vacuum chamber of the filter so that the water formed in the filter cake through the condensation of steam is completely drawn up. In addition, there is no excessive heating of the filter cake surface, so that no changes in the solids occur. By maintaining the steam at its most favorable condition, the use of steam is more efficient economically, and the residual moisture of the filter cake can be reduced to an optimum value. To accomplish this result, the determination of the degree of dehydration takes place by measuring the quantity of air drawn through the filter cake.

The invention also embodies an improved filter for carrying out the method, the filter elements being partially covered by a steam containing jacket which, in turn, is connected to a hot steam producing means. The jacket is separated into at least two chambers, one of which is connected to the hot steam producing means, and the other chamber is in open communication with the filter elements. By this arrangement, an optimum distribution of the quantity of hot steam within the jacket is attained. In the first chamber of the jacket, fluctuations in pressure and fluctuations in temperature of the introduced superheated steam may be equalized, and the second chamber then receives steam which has a constant pressure and temperature. Consequently, the filter cake is heat treated more effectively, with the prevention of surface condensation water on the filter cake, and an optimum water withdrawal from the filter cake. The coarse capillary water is removed early from the cake, so that steam may be drawn up and become effective in the cake while there is still sufficient time for the discharge of the cake in order to draw up a very large part of the heated water remaining in the filter cake.

In a preferred form of the present invention, the chambers in the steam jacket are arranged in superposed relation, and the steam jacket together with the dividing means between the chambers approximates the outer contour of the filter elements. This construction provides a spatially favorable arrangement of the steaming jacket to the particular form of filter elements. Also, the lower chamber in the jacket may be indirectly heated over the entire chamber length by the superheated chamber lying above it into which the steam is introduced, so that the formation of condensate is completely prevented in the lower chamber.

In a particularly preferred form of the invention, the hot steam producing means and the steam withdrawl means are provided at one end of the jacket and at the other end of the jacket there is a connecting opening provided in the divider between the two chambers. The stream of steam is thereby conveyed over the entire length of the upper chamber and at the lower end flows into the lower chamber whereupon it passes through the lower chamber in direct contact with the filter cake in countercurrent relation to the stream of steam in the upper chamber. Consequently, the steam in the upper chamber gives off heat to the steam flowing through the lower chamber and the formation of condensate in the lower chamber is essentially prevented.

In a further embodiment of the invention, the divider between the two chambers consists of a good heat conducting material, so that the heat transfer from the upper chamber into the lower chamber is improved. In addition, for the prevention of condensate formation in the upper chamber of the jacket, and in order to prevent heat losses, it is desirable that the outer wall of the jacket be provided with thermal insulation.

In another embodiment of the invention, the jacket is arranged so that it begins in the area of the suction zone or the dehydration zone of the filter and terminates in spaced relation in front of the removal apparatus for the filter cake. Consequently, it is possible to provide a condensation front which migrates through the filter cake so that in the hydration zone, a substantial withdrawal of the filtrate takes place.

The length of the jacket and/or the divider between the chambers is preferably made adjustable at least in the area of the pre-dehydration zone of the filter elements. With this arrangement, the filtering characteristics can be adjusted depending upon the particular composition of the suspension or sludge being filtered. For example, the jacket or the divider may be moved in the direction of the rotation of the filter so that the steam is conveyed solely to the already pre-dehydrated filter cake. Consequently, the degree of dehydration is improved overall and the amount of steam used is appreciably decreased.

In another preferred embodiment of the invention, the area between the end of the jacket and the filter cake removal apparatus is provided with a second jacket which is connected to a hot air producing means. In this region there is also provided a measuring zone. Means are provided behind the filter for measuring the quantity of air drawn up from the hot air jacket so that the porosity or the permeability, respectively, of the filter cake and consequently the degree of dehydration can be determined in a simple manner, thereby determining the grain size distribution, the average grain sizes, the grain form, and the like. A capillary pressure in the dehydration zone must be overcome by the vacuum applied there before the water in the pores is drawn out. To achieve this, the filter cake must have a predetermined layer thickness. This thickness can be controlled to an optimum so that the vacuum in the suction zone is controlled in response to the particular characteristics of the raw material, and the quantity of air drawn through the filter cake is determined and is used to regulate the degree of vacuum. In addition, depending on the measured values, the quantity of superheated steam introduced into the jacket may be regulated. Accordingly, on the one hand, an economical utilization of the available steam is achieved, and on the other hand the filter cake is not so highly heated that unwanted changes occur in the filter cake which would affect subsequent treatment or the processing. Likewise, depending upon the measured values, the rate of rotation of the filter drum may be adjusted. In addition it is possible to regulate the temperature and the pressure of the steam so that an optimum adaptation to the composition of the filter cake may be made.

In accordance with the present invention, the steam jacket and/or the hot air jacket may be provided with sealing elements which engage the circulating edges of the filter elements. This provides a reliable sealing of the steam jacket and the hot air jacket with respect to the surrounding atmosphere, even at higher pressures of steam or hot air, so that an overload is prevented with respect to operating personnel. It is suitable in this regard that the front walls of the steam jacket or the hot air jacket are connected through flexible sealing lips at the surface of the filter cake. In this way, definite outlet openings are achieved so that excess hot vapors or hot air may issue solely at these points, and may be withdrawn by a withdrawl apparatus arranged above the outlet points, preferably with a vapor recovery means.

Figure 2:
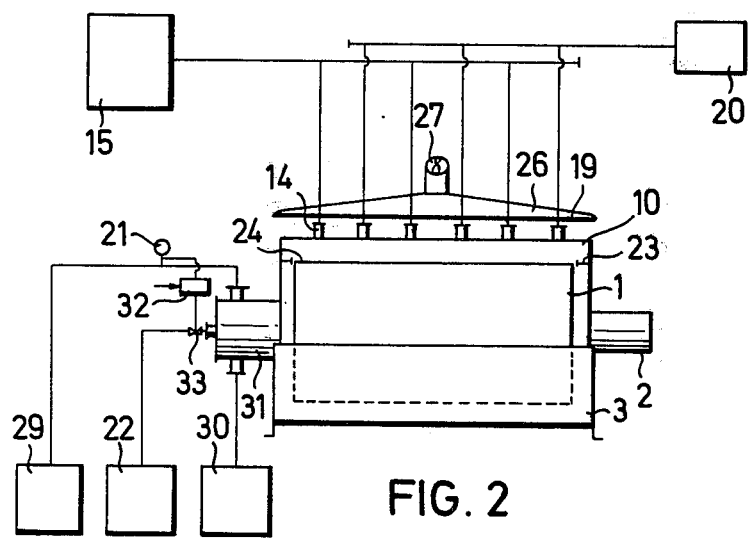
FIG. 2 is a diagrammatic showing of the vacuum drum filter in elevation.

The invention will be explained in greater detail on the basis of the attached drawings. In the drawings, the drum filter shown in FIGS. 1 and 2 consists of a filter element 1 in the form of a drum which is mounted for rotation on a drum shaft 2 and is immersed in a sludge or suspension trough 3 to which the suspension to be filtered is delivered. The drum 1 is provided with a sleeve 4 which carries a foraminous filter fabric and is also provided with a vacuum which is drawn through the shaft 2 of the drum. The drum circumference is divided into individual treatment zones. beginning with a suction zone 5 which extends over the drum circumference and is immersed in the suspension, followed by a dehydration zone 6 and a measuring zone 7. An aeration or ventilating zone 8 is provided for assisting in the removal of the filter cake and a washing or rinsing zone 9 provides for the washing of the filter fabric or web.

The suction zone is separate from the dehydration zone and is connected with a separate low pressure vacuum tank 22. Similarly, the measuring zone 7 and the dehydration zone 6 have separate low pressure vacuum tanks 29 and 30. The low pressure vacuum tanks are connected with vacuum pumps, not shown in the drawings.

Above the suspension trough 3, the filter drum 1 is partly covered by a steam jacket 10 which extends approximately to the end of the dehydration zone 6. The jacket 10 of the filter drum is separated into two chambers 11 and 12 which are in superposed relationship and are separated by a heat conducting divider 13 so that the lower chamber 12 is in open communication with the drum surface. At the end of the suction zone 5 or at the beginning of the dehydration zone 6, the divider 13 in the jacket 10 has a connecting opening 16 from the upper chamber to the lower chamber. The jacket 10 and the divider 13 have a contour corresponding to the cylindrical form of the filter drum. The upper chamber 11 of the jacket 10 is provided at its outer walls with a heat insulating layer 17.

In the region of the suction zone 5 and the dehydration zone 6, the jacket 10 or the divider 13 is preferably constructed so as to be slidable and adjustable between the two chambers 11 and 12 so that this part of the jacket can be moved over the suction zone 5 and for a predetermined length into the dehydration zone 6.

The measuring zone is connected with the dehydration zone 6 is similarly provided with a cone or jacket 18 which has a connecting pipe 19 leading to a hot air generator 20. The hot air cone or jacket 18 is in open communication with the surface of the filter drum. A measuring apparatus 21 is located behind a control head 31 of the filter for measuring the quantity of air drawn out of the hot air jacket 18, the quantity of air being located in the connecting conduit between the control head 31 for the low pressure vacuum tank 29 of the measuring zone 7. The measuring apparatus 21 is connected by means of a regulator 32 with a regulating valve 33 which is provided in the connecting conduit from the control head 31 to the low pressure vacuum tank 22 for the suction zone.

The jacket 10 or the hot air cone or jacket 18 may be provided on their side walls with sealing elements 23 which preferably consist of synthetic material, to abut on the circulating or rotating edges 24 of the filter drum 1 thus resulting in a pressure tight connection. The front walls of the steam jacket 10 and the hot air jacket 18 may be provided with sealing lips 25 which lie on the surface of the filter cake. In the transition area between the dehydration zone 6 and the measuring zone 7, and above the steam jacket 10 and the hot air jacket 18 there is provided a withdrawal apparatus 26 consisting of a vapor cone or dome with a suction ventilator 27 for the withdrawal of escaping hot vapors or for the withdrawal of hot air.

In operation, the suspension to be filtered is supplied to the trough 3. During the rotation of the filter drum 1 through the suction zone 5, the solids contained in suspension are drawn onto the filter surface and there form a layer of solids, while the filtrate is drawn through the interior of the drum and through its shaft 2 through the control head 31 with the aid of vacuum applied to the low pressure vacuum tank 22. The layer of solids becomes thicker during the further rotation of the drum through the suspension and forms a filter cake. This cake during the further rotation of the drum extends from the suction zone 5 into the dehydration zone 6 and is covered by the steam jacket 10. While the filter cake is rotated through the dehydration zone 6, water is first withdrawn from the coarse capillaries in the filter cake and the upper and lower chambers 11 and 12 of the steam jacket 10 are furnished with hot steam. The superheated steam passes from the steam producer 15 through the connection 14 into the upper chamber 11, flowing through the same in the longitudinal direction, and then passes through the connecting opening 16 in the divider 13 between the chambers into the lower chamber 12. Then, the steam passes through the lower chamber 12 in countercurrent contact with the steam passing in the chamber 11 over the entire length of the chamber. The heat conducting divider 13 is heated by the superheated steam introduced into the chamber 11 and gives off its heat to the steam flowing in the lower chamber 12 so that the latter is heated indirectly and in this manner insures that the steam has an equally high temperature in the lower chamber area, preventing the formation of condensate.

The steam of uniformly high temperature is drawn out of the lower chamber 12 into the filter cake and condenses there with the formation of a uniform condensation front close to the interface between the filter cake and the filter drum. During the condensation, the filter cake because of the release of the latent heat of vaporization is heated so that the viscosity and the surface tension of the water is greatly lowered, and may be sucked from the vacuum applied by means of the low pressure vacuum tank 30 almost completely out of the filter cake as a filtrate, so that the filter cake has a very much lower moisture content.

Excessive condensate formation of the superheated steam introduced into the upper chamber 11 is prevented to a substantial extent by the heat insulation 17 on the steam jacket. In addition, any condensate which may occur in the upper chamber 11 is collected below the collection opening 16 in the divider 13 or it is conveyed directly to the suspension trough. In this way, increase in the moisture of the filter cake due to condensation is prevented.

In order to determine the vacuum required in the suction zone 5 for the particular consistency of the filter cake being produced, or in order to adjust accurately the quantity of the superheated steam introduced into the steam jacket 10, the measuring zone 7 following the dehydration zone 6 is used to determine the degree of dehydration of the filter cake. For this purpose, hot air is introduced from the hot air producer 20 into the jacket or cone 18 arranged above the measuring zone 7 where it is drawn through the filter cake by means of the vacuum present. The quantity of hot air drawn through is determined by the measuring apparatus 21 which supplies the data for the degree of dehydration and consequently the composition of the filter cake. In response to these measured values, the regulating valve 33 for the vacuum in the suction zone is actuated with the regulator 32 so that the filter cake forms and the dehydration conditions are optimal in the dehydration zone. The measurement of the hot air also provides a means for determining the pressure and temperature of the superheated stream introduced into the jacket 10. It is also possible to alter the rate of rotation of the filter drum in response to the values measured from the measuring zone 7.

The clouds of hot steam escaping from the steam jacket 10 or the hot excess air from the jacket or cone 18, respectively, are drawn through a vapor cone or dome 26 which is preferably located where the steam jacket 10 joins the measuring cone or dome 18. After passing through the measuring zone 7, the filter cake reaches the aeration zone 8 where it is released from the filter drum 1 and through the removal apparatus 28 is supplied to a suitable collecting means.

In the washing zone 9, the filter web or fabric is then purified through the use of spray nozzles or the like before the drum filter 1 again rotates into the suction zone 5.

The method according to the present invention is not limited only to the use of a drum filter, but can be used with other types of suction filters such as disc filters or plane filters. Furthermore, the steam jacket arrangement is utilizable to advantage even with pressure filters.

Also, the invention is not only useful in the dehydration of coal slurries but can be used for the preparation of other minerals, for example, for the preparation of inorganic minerals and ores, or in the filtration of organic residues from suspension.

It should be evident that various modifications can be made to the described embodiments without departing from the scope of the present invention.

We claim as our invention:

1. A method for the dehydration of an aqueous suspension which comprises applying said suspension to the surface of a vacuum filter, directing steam along an imperforate partition means parallel to said surface in one direction, thereafter passing said steam in the opposite direction into contact with the filter cake on said surface whereby substantially the entire effective area of said filter cake is acted upon by steam of uniformly high temperature, and eliminating condensation of said steam on said filter cake by said partition means.

2. A method according to claim 1 in which said filter includes a suction zone and a dehydration zone following said suction zone, and a lower vacuum is applied in the suction zone than in the dehydration zone.

3. A method according to claim 2 which includes the step of sensing the degree of dehydration of the filter cake beyond the area in which said filter cake is contacted with steam, and adjusting the degree of vacuum in said suction zone in response to said degree of dehydration.

4. A method according to claim 3 in which the sensing is carried out by measuring the quantity of air sucked up through the filter cake.

5. A method according to claim 2 which includes the step of sensing the degree of dehydration of the filter cake beyond the area in which said filter cake is contacted with steam, and adjusting the quantity of steam flow in response to said degree of dehydration.

6. A vacuum filter for dehydrating an aqueous slurry which comprises a rotatable drum having a foraminous filter surface thereon, an arcuate jacket in spaced parallel relation to a portion of the periphery of said drum, imperforate highly heat conductive divider means dividing said jacket into two superposed chambers, inlet means connecting the outermost of said chambers to a source of steam, and the innermost of said chambers being in open communication with said filter surface, said divider means extending a sufficient distance about the periphery of said drum so as to substantially eliminate any condensation of steam on a filter cake which is formed on the filter surface.

7. A vacuum filter according to claim 6 in which said inlet means and a steam venting means are located at one end of said jacket, and at the other end of said jacket are means in said divider providing a steam flow passage from said one chamber to said second chamber.

8. A vacuum filter according to claim 6 which includes a suction zone and a filter cake removal zone, said jacket extending from said suction zone in proximity to said filter cake removal zone.

9. A vacuum filter according to claim 8 which includes a source of heated air located between one end of said jacket and said filter cake removal zone.

10. A vacuum filter according to claim 9 which includes means for monitoring the amount of heated air passing through the filter cake.

11. A vacuum filter according to claim 9 in which said source includes flexible sealing lips arranged to ride on the surface of said filter cake.

12. A vacuum filter according to claim 6 in which said jacket is adjustable in length along the periphery of said drum.

13. A vacuum filter according to claim 6 which includes thermal insulation about the outer wall of said jacket.

14. A vacuum filter according to claim 6 which includes sealing elements extending from said jacket into contact with said filter surface.

* * * * *